मुद्रित 3,094,052
Patented June 18, 1963

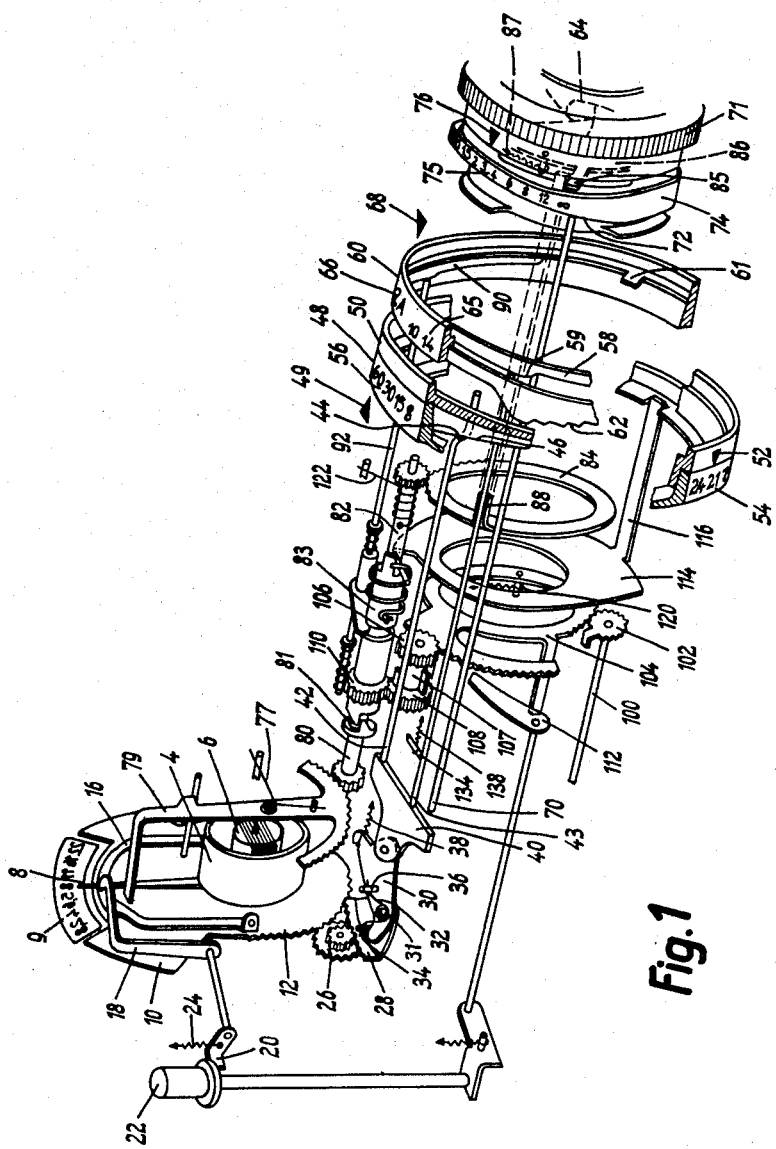

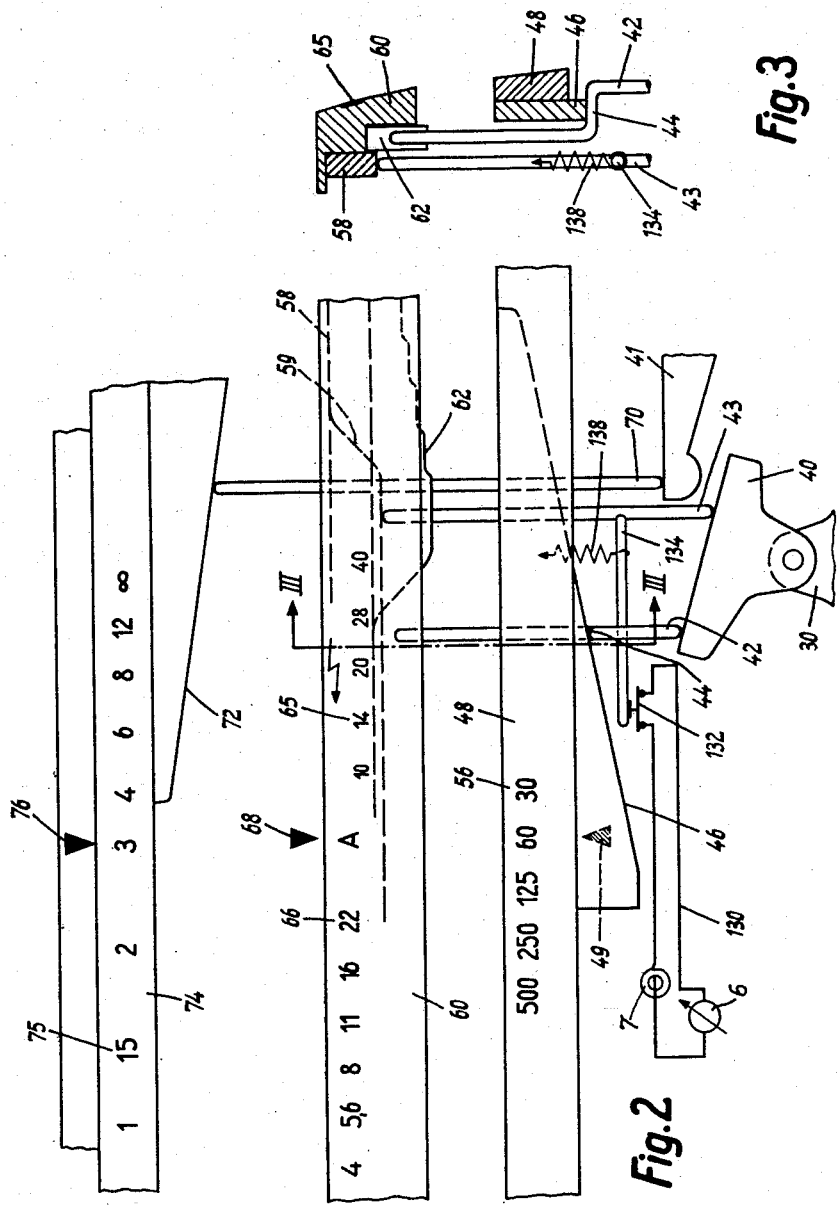

3,094,052
PHOTOGRAPHIC CAMERA
Franz Singer, Munich, Germany, assignor to Compur-Werk G.m.b.H. & Co., Munich, Germany, a firm of Germany
Filed May 15, 1962, Ser. No. 194,757
Claims priority, application Germany May 19, 1961
12 Claims. (Cl. 95—10)

This invention relates to a photographic camera, and more particularly to a camera of the kind having a movable or adjustable focusing member, shutter speed setting member, and diaphragm aperture adjusting member, as well as a built in exposure meter which serves to set the diaphragm aperture according to prevailing light conditions, when certain other variable factors have previously been set manually, for example.

An object of the invention is the provision of a generally improved and more satisfactory camera of this kind.

Another object is the provision of a camera of this general type, so designed and constructed that it may be used easily and efficiently for flash light photographs, as well as photographs taken by natural light or by artificial flood light.

Still another object is the provision of a camera so designed and constructed as to set the diaphragm aperture automatically, when taking flash photographs, as well as when taking non-flash photographs.

A further object is the provision of such camera mechanism so designed and constructed as to utilize, for the flash photograph diaphragm setting means, many of the parts used in the means for setting the diaphragm when non-flash photographs are taken, thus minimizing the number of extra parts or special parts needed for setting the diaphragm when flash photographs are made.

These and other desirable objects may be attained in the manner disclosed as an illustrative embodiment of the invention in the following description and in the accompanying drawings forming a part hereof, in which:

FIG. 1 is an exploded perspective view of a shutter and associated parts of a photographic camera, according to a preferred embodiment of the invention;

FIG. 2 is a schematic view of the setting members for adjusting the camera to the factors which govern correct exposure; and FIG. 3 is a section taken approximately on the line III—III of FIG. 2.

The preferred form of the present invention is disclosed in connection with a camera of a general kind or style already known in the art, although this general kind or style of camera as heretofore known does not have the present mechanism which enables the automatic setting of the diaphragm when taking flash photographs. The following disclosure presupposes, however, that the reader is already familiar with previous camera and shutter constructions of this same general kind or style, such as those disclosed in the copending United States patent application of Franz Singer, Serial No. 94,038, filed March 7, 1961 (now Patent 3,071,054, granted January 1, 1963), and in the various prior patents and applications referred to therein, especially in Gebele Patent 2,969,004, granted January 24, 1961, and Gebele Patent 3,013,478, granted December 19, 1961. To simplify the present disclosure, therefore, it will omit detailed description of various features of construction and operation which should be understood by those familiar with the above mentioned applications and patents. The present application may be regarded as a continuation-in-part of the above mentioned application Number 94,038, and as a specific modification of and an improvement upon the construction shown in that application.

Referring now to the drawings of the present application, and particularly to FIG. 1, the structure in its preferred form includes an exposure meter of the usual moving coil galvanometer type, comprising a permanent magnet 4 mounted on a base plate 10, and a moving coil 6 rotatable with respect to the magnet and powered by the usual conventional photoelectric cell (not shown) which is mounted in a suitable position on the camera body (also not shown). The coil 6 is connected to the movable pointer 8, which sweeps over a diaphragm aperture scale 9, conveniently marked in the usual series of f numbers on a transparent plate visible through a window in the camera body.

The base plate 10 of the measuring instrument is mounted to rotate relatively to the camera body, about the pivotal axis of the pointer 8 and coil 6. Gear teeth 12 are provided on part of the peripheral edge of the plate 10. Also mounted on the plate 10 is a bail-like clamping member 16 lying in front of the pointer 8 so that when the clamping member is swung rearwardly on its pivots, it will deflect the pointer 8 slightly rearwardly into engagement with the plate 10, thus clamping the pointer in whatever position it happens to occupy at the moment, enabling the pointer to be used as a stop or abutment for a movable feeler member. The clamping member 16 is actuated by an arm 18 on a shaft mounted for rotation in the camera body, which shaft has a second arm 20 engaged by a portion of the release plunger 22 of the camera, so that when the release plunger is depressed to initiate an exposure cycle, the arm 20 will be swung against the action of a light spring 24, and the clamping member 16 will be actuated to clamp the pointer.

For rotating the mounting plate 10 of the measuring instrument of the light meter, there is a stepped gear 26, the larger diameter gear of which meshes with the teeth 12 on the plate 10, while the smaller diameter gear of the stepped gear meshes with teeth on a crown wheel gear sector 28. This gear sector and a lever 30 are both rotatably mounted on a pivot pin 31 on the camera body. A torsion spring 32 is wrapped around the pin 31, and has one end bearing against a pin 34 on the gear sector 28, while the other end of the spring bears against a pin 36 on the lever 30. The action of the spring tends to maintain the pin 34 in contact with an ear on the lever 30, thus determining a normal fixed position of the lever 30 with respect to the gear 28, but limiting the counterclockwise torque which the lever 30 can transmit to the gear sector 28. Another spring 38, one end of which is anchored at a fixed point in the camera body, has its other end engaged with the lever 30 to tend to turn the lever 30 in a clockwise direction on its pivot 31.

A rocker 40 is pivotally mounted on the lever 30. The right hand arm of the rocker (that is, the arm which is to the right when viewed as in FIG. 1) engages the rear end of a push rod 42, and the left hand arm of the rocker engages the rear end of a push rod 43. The action of the spring 38, in tending to turn the lever 30 in a clockwise direction, tends to move the rocker 40 bodily forwardly toward the front of the camera, thereby keeping it engaged with the rear ends of the push rods 42 and 43, which extend forwardly in directions substantially parallel to the optical axis of the camera.

The push rod 42 is formed near its forward end with an offset or shoulder 44 which engages with and is operated by a cam 46 operatively connected to the shutter speed setting ring 48 to be moved thereby. As usual, the shutter speed setting ring rotates around the optical axis of the shutter and lens assembly, and is marked with a conventional shutter speed scale 56 read in connection with a fixed reference mark 49 on a suitable part of the camera body or the shutter housing structure. The cam 46 has a rise in the direction of the optical axis. This cam may be formed directly on the shutter speed ring 48, but preferably it is formed as part of a separate ring 50 which is coupled to the speed setting or adjusting ring 48 so that it may be turned relative thereto in order to introduce another variable factor, such as film speed or film sensitivity, which may be introduced into the mechanism by turning the ring 50 until the index mark 52 thereon is opposite the proper graduation of a film speed scale 54 marked on the shutter speed adjusting member 48. The coupling between the rings 48 and 50 is preferably a frictional coupling of known form. The rotation of the shutter speed setting ring 48 serves to control the shutter speed in conventional manner, the shutter mechanism including the conventional internal speed control ring 114 connected to the external speed control or setting ring 48 by means of an arm 116 which engages a notch in the ring 48. Rotation of the internal control ring 114 to various positions of adjustment serves to control or adjust, in well known manner, the usual retarding gear mechanism of the shutter.

With this construction, it is seen that when the external speed setting or adjusting ring 48 is turned, the ring 50 will turn with it (because of the frictional coupling between the two rings) and thus the cam 46 will be turned, and the rise thereof will displace the rod 42 in an axial direction, pushing the rod further rearwardly against the force of the spring 38 when the speed control ring 56 is turned in one direction, or releasing the rearward pressure on the rod when the speed control ring is turned in the opposite direction, thereby allowing the spring 38 to move the rod 42 forwardly. The resultant axial movement of the rod 42 tilts the rocker 40 about the rear end of the other push rod 43 as a fulcrum, thereby causing the lever 30 to turn, and through the gears 28 and 26 causing the mounting plate 10 of the exposure meter measuring instrument to rotate, to introduce into the mechanism the shutter speed factor, as modified by the film speed factor.

The forward end of the other push rod 43 bears on a cam 58 which has a step or steep portion 59 which has a steep rise in the direction parallel to the optical axis. The cam 58 is rigidly connected with a selector ring 60 rotatable about the optical axis as a center. Rotation of the ring 60 thus places the rod 43 in either one of two positions, one being on the high part and the other on the low part of the cam 58.

In addition to the previously mentioned cam 58, 59, the selector ring 60 also has fixed to it a second cam 62, which is a stepped cam with short inclined transition portions between successive steps, as seen in FIGS. 1 and 2. In certain positions of the selector ring 60, the various steps of this cam 62 engage the front end of the push rod 42 (forwardly of the shoulder or offset 44 thereof) and control the longitudinal position of this push rod.

The periphery of the selector ring 60 carries a circumferentially extending flash guide number scale or flash factor scale shown at 65. Just beyond the small end of this scale (the smallest flash guide number being "10" in the example here shown) is the mark "A," which in turn is followed by a diaphragm aperture scale 66 graduated circumferentially in the usual $f$ number series. The flash factor or guide number scale, the $f$ number scale, and the mark "A" are all read in conjunction with a fixed reference mark 68 on a suitable stationary part of the housing or casing.

When the mark "A" on the selector ring 60 is set opposite the reference mark 68, the parts of the mechanism are set for "automatic" operation, that is, taking a daylight photograph with automatic selection of the diaphragm aperture after previous manual selection of any desired shutter speed. In this position, the front end of the push rod 42 is not in contact with the cam 62, and the longitudinal position of the rod is governed by contact of the cam 46 with the abutment or shoulder 44 on this push rod. The front end of the other push rod 43 is engaged with a high portion of the cam 58, which holds the push rod 43 stationary in a comparatively rearward position. If, however, the selector ring 60 is turned in a clockwise direction when viewed as in FIG. 1 (or moved to the left when viewed as in FIG. 2) so as to bring one of the graduations of the flash guide number scale 65 opposite the index mark 68, then the inclined step 59 of the cam 58 will move beyond the front end of the push rod 43 so that a low portion of this cam will be opposite the front end of this rod, and the push rod 43 can move forwardly, so that the rocker 40 can rock on its pivot far enough to make contact with another push rod 70 and be controlled thereby, as further described below. This same movement of the selector ring 60 also carries the cam 62 to a position at the front end of the push rod 42, displacing this push rod rearwardly so that the shoulder or offset 44 thereof is moved rearwardly out of contact with the cam 46, and the longitudinal position of the rod 42 is now controlled by the steps of the cam 62, rather than by the contour of the cam 46.

On the other hand, if the selector ring 60 is turned counterclockwise when viewed as in FIG. 1 (moved to the right when viewed as in FIG. 2) so as to bring one or another of the $f$ number graduations 66 opposite the index mark 68, then the position of the push rods 42 and 43 is the same as when the selector ring is set for "A" or automatic operation, the push rod 43 being held in a constant rearward position by the high part of the cam 58, and the push rod 42 being released at its forward end so that its position is controlled by engagement of the shoulder 44 with the cam 46.

The above mentioned third push rod 70 is relatively close to the push rod 43 so as to cooperate with the same end of the rocker 40 which cooperates with the rod 43. This rod 70 extends forwardly and has its forward end engaged by a focusing cam 72 on a focus adjusting ring 74 rotatable on the objective or lens mount assembly indicated in general at 71. It is premissible but not necessary to have the objective permanently mounted on the camera, for those skilled in the art will readily recognize that this construction as herein disclosed is suitable for use with a detachable or interchangeable objective, and this fact has been graphically illustrated in FIG. 1 by a partial illustration of the conventional bayonet wings or lugs on the objective, as customarily furnished on a detachable or interchangeable objective. The focus adjusting ring 74 turns on the objective mount, about the optical axis as a center, in the usual manner, and it carries a focus distance scale 75, graduated in any suitable units of distance (such as feet or meters), the objective being focused by turning the ring 74 until the selected distance graduation is brought opposite the index mark 76 on a suitable part of the lens mount. The mount contains the usual conventional iris diaphragm 64, the opening and closing movements of the diaphragm leaves being controlled by a diaphragm operating ring 86 rotatable within the lens mount and urged by a spring 87 to rotate in a direction to reduce the diaphragm aperture to the minimum size.

For controlling the size of the diaphragm aperture during an automatic exposure, and also during a flash photograph, there is a sensing device comprising a sensing arm 79 mounted in the camera body for rotation about an axis coincident with the axis of rotation of the meter pointer 8. The arm 79 swings until it engages the pointer 8 (at a time when the pointer is clamped fast by the clamp 16) and thus the position of the pointer at this time determines how far the arm 79 can swing from its initial position toward its opposite position, during this part of the operating cycle. The extent of movement of the sensing arm or feeler 79 is transmitted to the diaphragm aperture control ring 86 through intermediate transmission mechanism which is known per se and well understood especially by those who are familiar with the above mentioned Gebele Patent 3,013,478 which discloses transmission mechanism of this same type except that in the patent the swinging motion of the feeler is in the opposite direction from that which is preferred in the present construction, so that a motion reversing gear is present in the patent (shown at 108 in the patent) but is omitted in the present structure. Merely to summarize briefly the transmission mechanism, the further details of which are described more fully in the patent just mentioned, it may be said that the swinging motion of the sensing arm or feeler 79 turns a shaft 80, and through a disengageable clutch 81 turns a sleeve 83 slideable longitudinally on a shaft 82 alined with the shaft 80. At the front of the shaft 82 is a pinion meshing teeth on the diaphragm control ring 84, which ring has a forwardly extending arm 88 which serves as a limit stop for an arm 85 on the diaphragm actuating ring 86, so that the spring 87 can turn the actuating ring 86, in a diaphragm closing direction, no farther than permitted by the position of the arm 88 on the ring 84, which position is dependent (under automatic exposure circumstances and under flash exposure circumstances) on the position in which the feeler 79 stops when it engages the clamped pointer 8 and can swing no farther.

Just as in the above mentioned Patent 3,013,478, the disengageable clutch 81 in the transmission mechanism from the feeler to the diaphragm is operated by a cam 90 on the selector ring 60, which cam 90 engages the front end of a rod 92 which carries a shifting fork engaging the sleeve 83 to move this sleeve longitudinally to engage or disengage the clutch 81. When the selector ring 60 is turned to a non-automatic exposure position where the aperture is to be determined manually rather than automatically, the cam 90 allows the rod 92 to move forwardly under the influence of a suitable spring, to open or disengage the clutch 81, so that the ring 84 is no longer controlled by the feeler 79 but is turned by the spring 122 to its extreme counterclockwise position (viewed from the front as in FIG. 1) so that the arm 88 thereon does not form a stop or limit for the arm 85 of the diaphragm actuating ring 86. On the contrary, an arm 61 on the selector ring 60 now serves as a stop for a suitable arm (not shown) on the diaphragm actuating ring 86, so that the position of this diaphragm actuating ring, under the influence of its spring 87, is determined by the rotary position or orientation of the ring 60, and the diaphragm will be set to whatever aperture is indicated by the f number of the scale 66 which has been brought opposite the index mark 68. But when the selector ring 60 is turned to the "A" position, the cam 90 pushes the rod 92 rearwardly to cause the clutch 81 to be operatively engaged, in the manner disclosed in the above mentioned Patent 3,013,478 and also disclosed in the above mentioned patent application, Serial No. 94,038. According to the present invention, the cam 90 is extended in a circumferential direction so that this rearward position of the rod 92 (holding the clutch 81 engaged) is maintained not only when the selector ring 60 is in the "A" position but also when it is in any one of the flash positions, with one or another of the flash guide numbers 65 opposite the index mark 68.

The shutter itself is not shown in detail, since the details thereof are not important for purposes of the present invention. It is sufficient for purposes of the present invention to say that, as well known in the prior art and especially as disclosed in the prior patents and applications above mentioned, the shutter is of the type which is to be cocked or tensioned in advance of each exposure cycle, and includes a cocking or tensioning shaft 100 rotatable in any known manner by suitable mechanism on the camera body (usually by the operation of the film winding or transport mechanism) so as to tension or cock the "master member" and other parts of the shutter, to make the mechanism ready for the exposure cycle. The rotation of the shaft 100 rotates in a pinion 102 to move the control ring 104 in a tensioning direction, against the force of its return spring 120. Through the gear 106, the overrunning clutch 107, and the pinion 108, the pinion 110 on the sleeve 83 of the follow-up shaft 82 is turned in a clockwise direction (when viewed from the front as in FIG. 1) during the tensioning operation, thereby swinging the feeler or sensing arm 79 to its counterclockwise limit of motion, and turning the diaphragm control ring 84 to its counterclockwise limit of motion, so that the arm 88 thereon, engaging the arm 85 of the diaphragm actuating ring 86, opens the diaphragm to maximum aperture. Whenever the clutch 81 is in its open or disconnected position, the spring 77 moves the feeler 79 to its counterclockwise limit.

When the parts have been fully tensioned or cocked, they are held in this position by a latching pawl 112 which is coupled in known manner to the release plunger 22 of the camera. When the release plunger is depressed, this not only actuates the clamp 16 of the pointer 8 as already described, but also releases the latching pawl 112 so that the exposure mechanism begins to run down from its tensioned position toward its rest position, under the influence of the various springs 120 and 122 and 87 (which, of course, overcome the much smaller power of the light spring 77) in the manner understood in the art and described in the prior patents and applications above mentioned. The shutter blades will be opened and closed in known manner to make the exposure, the blades, blade ring, and master member being preferably in approximately the form disclosed in Gebele Patent 2,900,886, which is one of the patents referred to in the above mentioned Gebele Patent 3,013,478.

According to the present invention, the electric circuit of the photoelectric exposure meter is preferably rendered inoperative when a flash photograph is to be taken. The electric circuit of the exposure meter is schematically shown at 130 in FIG. 2, the circuit including the moving coil 6 previously mentioned, and the photoelectric cell schematically shown at 7. In this circuit 130 is a switch 132 controlled by an arm 134 on the push rod 43, the spring 138 tending to move the push rod forwardly to open the switch 132. It has already been explained that the cam 58 holds this push rod 43 in its rearward position (with the switch 132 closed, so that the circuit 130 is effective) whenever the selector ring 60 is either in the "A" position or in one or another of the manual aperture selecting positions. When the ring 60 is turned to one or another of the various flash positions, the cam 58 releases the forward end of the push rod 43 so that the spring 138 moves the push rod 43 forwardly, thereby opening the switch 132 and rendering the exposure meter circuit ineffective.

The operation of the exposure mechanism, both during "A" or automatic operation, and during operation when the diaphragm aperture is controlled manually, is substantially the same as described in detail in the copending patent application, Serial No. 94,038, and may be briefly summarized as follows: assuming that the mechanism has been tensioned or cocked, and is latched in tensioned position by the latching pawl 112, the feeler or sensing member 79 will be at its extreme counterclockwise limit of motion (viewed from the front as in FIG. 1) and will not interfere with the swinging of the pointer 8 to whatever position is determined by the amount of light falling on the photocell. The diaphragm control ring 84 will likewise be at its extreme counterclockwise position, and the diaphragm 64 will be open to maximum aperture. Assuming that an automatic exposure is to be made and that the selector ring 60 has been set accordingly, it is apparent that the shutter speed is manually selected by appropriately turning the ring 48, and thereby the cam 46 determines the longitudinal position of the push rod 42, longitudinal motion of which causes the rocker 40 to swing on the now stationary rear end of the push rod 43 as a fulcrum, thereby operating the parts 30, 28, and 26 to cause the mounting plate 10 of the meter to turn bodily in one direction or the other, which feeds the shutter speed factor into the mechanism. Then when the release plunger 22 is depressed, this simultaneously clamps the pointer 8 fast by means of the clamp 16, and releases the latching pawl 112, so that the mechanism begins to run down. The feeler 79 stops when it engages the clamped pointer 8, so that the ring 84 can turn no further, and this determines the diaphragm aperture, but the ring 104 can continue to run down through its full range of movement, the latter part of its running down movement serving in the familiar way to release the latch of the master member of the shuter, so that the master member operates the blade ring to open and close the conventional shutter blades to make an exposure at the speed determined by the position of the speed control ring 114 of the shutter, which is coupled by the arm 116 to the external speed setting ring 48 in the familiar way. If a non-automatic exposure, with manual control of the diaphragm aperture, is to be made, the operation is the same except that when the selector ring 60 is set to any of the manually controlled diaphragm aperture positions, the cam 90 allows the rod 92 to move forwardly so that the clutch 81 is disconnected, and the position of the ring 84 is no longer controlled by the feeler 79, but this ring moves to its extreme clockwise position, and the extent to which the diaphragm can be closed down by the spring 87 depends on the position of the arm 61 on the selector ring 60.

If a flash photograph is to be taken, then the turning of the selector ring 60 to bring one or another of the flash guide numbers 65 opposite the reference mark 68 serves, as already explained, to put the forward end of the push rod 42 into cooperative relation to the stepped cam 62, and the cam 58 allows the push rod 43 to move forwardly under the influence of the spring 138, not only opening the switch 132 in the exposure meter circuit, but also allowing the rocker 40 to swing so that the left end thereof, when viewed as in FIG. 1 (or right end, when viewed as in FIG. 2) moves forwardly to a position where it is controlled by the rod 70 instead of the rod 43. The forward end of this rod 70 engages the cam 72 on the focusing ring 74, so that the focus distance factor is introduced into the mechanism by the action of the cam 72 on the rod 70, while the flash guide number factor is introduced into the mechanism by the action of the stepped cam 62 on the rod 42. At this time, the rocker 40 is jointly controlled by the rods 42 and 70, so that these factors of flash guide number and focus distance are jointly fed into the mechanism through the rocker 40 and through the parts 30, 28, and 26, so that they jointly influence the rotary position of the mounting plate 10 of the exposure meter.

The electric circuit of the exposure meter is ineffective at this time, due to the opening of the switch 132 as above explained, so that the position of the meter pointer 8 will not be dependent on the amount of light falling on the photocell 7, but will be a position determined by the normal rest position of the pointer 8 with respect to the mounting plate 10, and by the extent to which the mounting plate 10 has been turned relative to the camera body, by operation of the parts 40, 30, 28, and 26. Hence, at the instant that the plunger 22 is depressed to start the actual exposure cycle, the pointer 8 will be clamped in a position relative to the camera body which is the result of the factors of distance of the principal object from the camera (that is, focus distance as determined by the setting of the ring 74) and flash guide number (as determined by the setting of the ring 60). Thus the integrated result of these two factors will determine the point, during its running down movement, at which the feeler or sensing arm 79 will be stopped by engagement with the clamped pointer 8, and this position of stoppage of the feeler 79 will determine the diaphragm aperture during the exposure, through the same train of diaphragm aperture controlling mechanism which comes into play during the making of an automatic exposure.

As a further feature, a rangefinder may be built into the camera, and may be coupled with the focusing ring as indicated in FIG. 2. The familiar operating lever 41 of the rangefinder mechanism (corresponding, for example, to the rangefinder operating lever 52 in Fahlenberg Patent 2,974,577) may simply be physically interposed between the rocker 40 and the rear end of the push rod 70, as shown in FIG. 2, so that the rocker 40 does not engage directly with the rear end of the rod 70, but engages with the lever 41, which in turn engages with the rod 70. When the selector ring 60 is in one of the daylight picture positions holding the rod 43 rearwardly, the rocker 40 does not engage either the rangefinder arm 41 or the rod 70, but the rod 70 is effective to control the position of the rangefinder operating arm 41 from the focusing cam 72. When the selector ring 60 is moved to a flash photograph position, the rocker 40 then engages a portion of the arm 41, and thus is controlled by the position of the arm 41 which in turn depends on the position of the rod 70 as determined by the position of the focusing cam 72.

The present invention thus permits the camera diaphragm aperture to be controlled automatically for taking pictures by flash, when once the focus distance and flash guide number have been manually set by the operator, without any further attention by the operator to the diaphragm aperture. This is done, according to the present invention, by utilization of an arrangement or mechanism which has hitherto been applied exclusively to daylight photography. Only minor modifications and a somewhat different selector member are needed to enable the known mechanism to perform this additional and valuable function. The resetting of the sensing device or feeler mechanism, when changing from automatic daylight diaphragm operation to automatic flashlight diaphragm operation, is effected simply by appropriately turning the selector ring, without the necessity of performing additional manipulations. A special diaphragm setting ring for setting the diaphragm aperture by hand during flash photography, is entirely unnecessary according to the present invention.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a focusing member, a shutter speed setting member, a flash factor setting member, an adjustable diaphragm, photoelectric exposure mechanism including a shiftable mounting member and a galvanometer coil mounted on said mounting member and rotatable with respect thereto and a pointer operatively connected to said coil to be moved thereby, means for clamping said pointer temporarily in a fixed position to serve as an abutment stop for a feeler, means including a feeler engaging the clamped pointer for determining an adjusted position of said diaphragm, transmission means for moving said mounting member thereby to cause bodily movement of said galvanometer coil with said mounting member, and means for making said transmission means responsive, at will, either to said shutter speed setting member, or to said focusing member and said flash factor setting member jointly.

2. A construction as defined in claim 1, in which said flash factor setting member has a plurality of different flash positions respectively corresponding to different flash guide numbers, and in which each of such different positions of said flash factor setting member produces a different responsive effect upon said transmission means.

3. A photographic camera comprising a shutter speed setting member having a first cam operatively connected thereto to be moved thereby, a focusing member having a second cam operatively connected thereto to be moved thereby, a flash factor setting member having a third cam operatively connected thereto to be moved thereby, a photoelectric exposure meter including a galvanometer coil and a pointer operatively connected thereto to be moved thereby, means for clamping said pointer in a fixed position, an objective diaphragm having an adjustable aperture, means for setting said diaphragm to an aperture dependent upon the clamped position of said pointer, transmission means for imparting rotary motion to said coil and pointer, and means for operatively connecting said transmission means at will either to said first cam to be influenced thereby, or to said second and third cams to be influenced thereby jointly and independently of the position of said first cam.

4. A photographic camera comprising a shutter speed setting member having a first cam operatively connected thereto to be moved thereby, a focusing member having a second cam operatively connected thereto to be moved thereby, a flash factor setting member having a third cam operatively connected thereto to be moved thereby, a photoelectric exposure meter including a galvanometer coil and a pointer operatively connected thereto to be moved thereby, means for clamping said pointer in a fixed position, an objective diaphragm having an adjustable aperture, means for setting said diaphragm to an aperture dependent upon the clamped position of said pointer, transmission means for imparting rotary motion to said coil and pointer, means including a first push rod operatively connected to said transmission means and engageable with said first cam for influencing said transmission means and thereby influencing the position of said coil and pointer by movement of said speed setting member when taking non-flash photographs, a second push rod interposed between said transmission means and said second cam, a third push rod effective when taking non-flash photographs to hold said transmission means operatively disconnected from said second push rod, and means responsive to movement of said flash factor setting member from a non-flash position to any one of a plurality of flash positions for operatively disconnecting said first push rod from said first cam and operatively connecting it to said third cam and for moving said third push rod to a position wherein said second push rod is operatively connected to said transmission means.

5. A construction as defined in claim 4, in which a rangefinder control lever is operatively connected to said second push rod.

6. A construction as defined in claim 4, in which said exposure meter has an electric circuit having a switch therein, and in which said switch is operatively connected to said third push rod to close said switch when taking non-flash photographs and to open said switch to make said circuit ineffective when taking flash photographs.

7. A construction as defined in claim 3, in which said transmission means includes a rocker, a gear moved by said rocker, and means operated by said gear for turning said coil and pointer.

8. A construction as defined in claim 4, in which said transmission means includes gear means for turning said coil and pointer, and a rocker having two arms pivotally connected at an intermediate point to said gear means, said first push rod cooperating with a first arm of said rocker, said second and third push rods cooperating with a second arm of said rocker.

9. A construction as defined in claim 8, further including a rangefinder control member operatively interposed between said second push rod and the second arm of said rocker.

10. A photographic camera comprising a shutter speed setting member, a flash factor setting member, a focusing member, an objective diaphragm having an adjustable aperture, an exposure meter having a pointer, and means controlled at least in part by said pointer for determining the aperture of said diaphragm, characterized by first means operatively connecting said pointer to said speed setting member to control the position of said pointer in part from the position of said speed setting member, second means operatively connecting said pointer to said flash factor setting member to control the position of said pointer in part from the position of said flash factor setting member, third means operatively connecting said pointer to said focusing member to control the position of said pointer in part from the position of said focusing member, and selector means movable to one position for rendering said first means effective and said second and third means ineffective, for taking non-flash photographs, said selector means being movable to another position for rendering said first means ineffective and said second and third means effective, for taking flash photographs.

11. A photographic camera comprising a shutter speed setting member, a flash factor setting member, a focusing member, an objective diaphragm having an adjustable aperture, an exposure meter having a pointer and a photocell, and means controlled at least in part by said pointer for determining the aperture of said diaphragm, characterized by first means operatively connecting said pointer to said speed setting member to control the position of said pointer in part from the position of said speed setting member, second means operatively connecting said pointer to said flash factor setting member to control the position of said pointer in part from the position of said flash factor setting member, third means operatively connecting said pointer to said focusing member to control the position of said pointer in part from the position of said focusing member, fourth means operatively connecting said pointer to said photocell to control the position of said pointer in part from said photocell, and selector means movable to one position for rendering said first and fourth means effective and said second and third means ineffective, so that non-flash photographs may be taken with the aperture of said diaphragm determined by the position of said pointer as influenced by said speed setting member and said photocell and uninfluenced by said flash factor setting member and said focusing member, said selector means being movable to another position for rendering said second and third means effective and said first and fourth means ineffective, so that flash photographs may be taken with the aperture of said diaphragm determined by the position of said pointer as influenced by said flash factor setting member and said focusing member and uninfluenced by said speed setting member and said photocell.

12. A photographic camera comprising a flash factor setting member, a focusing member, an objective diaphragm having an adjustable aperture, an exposure meter having a pointer and a photocell, and means controlled at least in part by said pointer for determining the aperture of said diaphragm, characterized by first means operatively connecting said pointer to said photocell to control the position of said pointer in part from said photocell, second means operatively connecting said pointer to said flash factor setting member to control the position of said pointer in part from the position of said flash factor setting member, third means operatively connecting said pointer to said focusing member to control the position of said pointer in part from the position of said focusing member, and selector means movable to one position for rendering said first means effective and said second and third means ineffective, so that non-flash photographs may be taken with the aperture of said diaphragm determined by the position of said pointer as influenced by said photocell and uninfluenced by said flash factor setting member and said focusing member, said selector means being movable to another position for rendering said second and third means effective and said first means ineffective, so that flash photographs may be taken with the aperture of said diaphragm determined by the position of said pointer as influenced by said flash factor setting member and said focusing member and uninfluenced by said photocell.

References Cited in the file of this patent

UNITED STATES PATENTS

| | | |
|---|---|---|
| 2,969,004 | Gebele | Jan. 24, 1961 |
| 3,013,478 | Gebele | Dec. 19, 1961 |
| 3,044,377 | Gebele | July 17, 1962 |